(12) United States Patent
Harmon et al.

(10) Patent No.: US 6,452,540 B1
(45) Date of Patent: Sep. 17, 2002

(54) METHOD AND APPARATUS FOR CONTROLLING SPOT BEAM CONFIGURATIONS FOR A COMMUNICATIONS SATELLITE

(75) Inventors: Garrick J. Harmon, Newport Beach; Stuart T. Linsky, Rancho Palos Verdes; David L. Brundrett, Culver City, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/759,659

(22) Filed: Jan. 12, 2001

(51) Int. Cl.$^7$ .................. H04B 7/185; H04Q 7/20
(52) U.S. Cl. ........................ 342/354; 455/429
(58) Field of Search ................ 342/354; 455/429

(56) References Cited

U.S. PATENT DOCUMENTS 5,227,802 A * 7/1993 Pullman et al. ............ 342/352
5,408,237 A * 4/1995 Patterson et al. .......... 342/354
5,739,784 A * 4/1998 Jan et al. ................... 342/354

* cited by examiner

Primary Examiner—Thomas H. Tarcza
Assistant Examiner—Fred H. Mull
(74) Attorney, Agent, or Firm—McAndrews, Held & Malloy, Ltd.

(57) ABSTRACT

A communications satellite method and are provided for controlling a configuration of spot beams produced by a communications satellite. A plurality of spot beams are generated by a communications satellite while maintained at a first orbital position with respect to a first portion of the earth. The plurality of spot beams are configured in a first cell pattern to substantially encompass a first portion of the Earth. The satellite is moved to a second orbital position with respect to a second portion of the earth. Once moved, the satellite is reconfigured such that a second plurality of spot beams form a second pattern 85 to substantially cover the new portion of the earth of interest. A network of switches allows the satellite 10 to be reconfigured for operation from multiple orbital positions. The switching network directs individual feeds to different signal paths having different bandwidth and power capabilities.

26 Claims, 5 Drawing Sheets

Feeds for Slot A  42
Feeds for Slots A and B  43
Feeds for Slot B  44

METHOD AND APPARATUS FOR CONTROLLING SPOT BEAM CONFIGURATIONS FOR A COMMUNICATIONS SATELLITE

BACKGROUND OF THE INVENTION

The preferred embodiments of the present invention generally relate to a satellite communications system, and more specifically to methods and apparatus for controlling and adjusting spot beam configurations formed by communications satellites that are relocatable between multiple orbital positions.

Communications satellite systems have been proposed that utilized satellites located in a geostationary (GEO) orbit at fixed orbital positions about the earth. The geostationary satellites are placed in orbit at fixed orbital positions to cover one or more land masses. The geostationary satellites generally remain at a predetermined orbital position throughout the life of the satellite. Typically, geostationary satellites include antennas, each comprising a reflector and one or more horn feeds that generate a pattern of spot beams designed to cover an entire target land mass. Each spot beam receives and transmits data signals to and from the satellite. Examples of proposed satellite systems include the Direct TV™ Network, Space Way™ proposed by Hughes, and AstroLink™, proposed by the assignee of the present invention.

In GEO satellite systems, the satellites maintain a fixed position with respect to the earth's surface in order to cover continuously a desired portion of the earth. Thus, as the earth rotates, a geostationary satellite rotates at a speed necessary to maintain a fixed line of sight at all times with a fixed portion of the earth.

Conventional and previously proposed GEO satellite systems have certain drawbacks. Satellites that use reflector antennas include one or more horn feeds in a feed pattern on an antenna platform. A spot beam pattern is determined when designing the satellite communication system, and the spot beam pattern defines the feed pattern, including the number and arrangement of feeds relative to one another, and relative to a reference point on the satellite. Conventionally, the feed pattern is designed for a particular satellite. For example, geostationary satellites intended for use over the United States are configured with a feed pattern designed to produce spot beams that cover a long rectangular land mass extending from California to Maine.

However, once the antenna is manufactured and fitted on the satellite, the satellite is best suited for coverage only over the United States. The same satellite is not configured with an antenna designed for use over a different land mass shape, such as Europe, Australia, Africa and the like. Europe, the United States and other land masses are shaped differently and include major metropolitan areas located in different relations with respect to one another. For instance, the United States includes major metropolitan areas in Los Angeles, Chicago and New York, that are configured relative to one another in a different manner than the major metropolitan areas of Europe, such as London and Paris. Thus, when designing a satellite antenna, different feed patterns are used on a satellite intended to cover the United States versus a satellite intended to cover Europe. Also, different signal attributes (e.g., bandwidth, power, etc.) are assigned to various horn feeds based upon the corresponding spot beams and geographic market areas. Horn feeds supporting Chicago are assigned more bandwidth and/or power than horn feeds supporting Montana. Hence, conventional and previously proposed antenna and satellite designs are limited to use with specific land masses and market areas, and are not interchangeable or moveable. A disadvantage of conventional and previously proposed satellite systems is the lack of interchangeability.

Also, the demographics and/or communications demands of a particular market may change or evolve in an unexpected or unpredicted manner. For instance, demand within the Midwestern United States may change or fail to increase at a projected rate. Therefore, a satellite previously designed and launched to meet a particular need in the Midwestern U.S. may not be utilized fully. Further, demand may increase at an unexpectedly high rate in the Southeastern U.S., thereby overloading the satellite resources available to that area. Conventional designs would require a new satellite to be manufactured and launched in order to operate optimally for lower Midwestern demand and higher Southeastern demand. It is undesirable to launch new satellites to meet these needs.

A need remains for a communications satellite system having satellites, each of which is capable of operation over multiple separate land masses. A need also remains for a communications satellite system capable of dynamically changing its capacity to meet new and unexpected market needs and to facilitate the phased-in introduction of new satellites. It is an object of the preferred embodiments of the present invention to meet these and other needs that will become apparent from the description set forth below of the preferred embodiments.

BRIEF SUMMARY OF THE INVENTION

A method is provided for controlling a configuration of spot beams produced by a communications satellite. The method includes generating a first plurality of spot beams from the communications satellite maintained at a first orbital position with respect to a first portion of the earth. The first plurality of spot beams are configured in a first beam pattern to encompass substantially a first portion of the earth. The satellite is moveable to a second orbital position with respect to a second portion of the earth. A second plurality of spot beams are configured in a second beam pattern to encompass substantially the second portion of the earth. According to at least one preferred embodiment, at least one common spot beam is utilized in the first and second pluralities of spot beams. Alternatively, the spot beams in the first and second pluralities of the spot beams may be mutually exclusive of one another. When a satellite is moved to a second orbital position, at least one new spot beam is typically activated and at least one old spot beam is typically deactivated.

According to an alternative embodiment, a method is provided that includes changing at least one signal attribute of at least one spot beam included in the first and second pluralities of spot beams. The signal attribute may be one of bandwidth, power and the like. When the satellite is moved from the first orbital position to the second orbital position, a spot beam utilized in both configurations may be rerouted through a new signal path in the satellite.

According to an alternative embodiment of the present invention, a communications satellite is provided having at least one antenna for transmitting and receiving communications signals. The antenna defines first and second ground cell coverage patterns associated with first and second portions of the earth when the satellite is located at first and second orbital positions, respectively. The satellite includes a switch network activating a first group of spot beams forming the first ground cell coverage pattern when the satellite is located in the first orbital position. The switch network activates a second group of spot beams forming the second ground cell coverage pattern when the cell is located at the second orbital position.

The antenna may include a plurality of horn feeds, each of which generates one spot beam when activated. One horn feed may be used to generate a spot beam in each of the first and second groups of spot beams directed to different portions of the earth. The antenna may further include multiple horn feeds divided into first and second groups. The switch network activates the first and second groups of horn feeds to generate first and second groups of spot beams, respectively, when the satellite is moved between the first and second orbital positions, respectively. The first horn feed group may include at least one horn feed not in a second horn feed group.

The satellite may further include multiple signal processors, each of which supports a different type or range of signal attributes such as bandwidth and/or power capabilities. The switching network may connect groups of spot beams to each signal processor depending upon the needs of the spot beam. For instance, beams having low demand require narrow bandwidth, and thus may be assigned to a signal path associated with one or more signal processors having a narrow bandwidth capacity. Similarly, beam spots having high demand require wide bandwidth and thus may be assigned to signal paths associated with signal processors capable of supporting a wide bandwidth.

In yet another further alternative embodiment, the communications satellite is provided with an antenna having multiple horn feeds capable of generating multiple spot beams. The horn feeds are divided into subsets that may or may not include common feeds. The feed subsets are activated separately based upon the orbital position of the satellite.

In yet a further alternative embodiment, a satellite communications system is provided, including user terminals for transmitting and receiving communications signals. The terminals are located around the earth in various cells. The system includes at least one satellite orbiting the earth at a predefined orbital position. The satellite includes an antenna having an array of horn feeds generating spot beams associated with the cells on the earth. The satellite activates different groups of horn feeds on the antenna to form different spot beam patterns associated with different predetermined orbital positions. The user terminals may include a gateway for relaying communications signals between a satellite and a land based communications network, such as a phone system, the internet, intranet, a wide area network, a local area network, and the like.

The system may further include a control terminal directing the satellite to move from one orbital position to another, such as when demand justifies the change. A satellite may be moved when another satellite fails in order to replace the failed satellite. Alternatively, a satellite may be moved when market demands change or do not reach expectations. For instance, a satellite having wide bandwidth may be centered over a portion of the United States expected to require large demand. However, after in use, it may be determined that the satellite's capabilities are not fully being utilized and may be better suited over a different land mass. As yet a further alternative, the satellites may be moved during the initial introduction of a constellation of satellites. All satellites in a system are typically not launched at the same time. Thus, for example, it may be desirable to locate a single satellite over the Atlantic Ocean in order to cover simultaneously the Eastern United States and Western Europe. Once a second satellite is launched, it may be desirable to move the first satellite to a location over the United States, while positioning the second satellite over Europe.

As a further alternative embodiment, the satellite system may switch individual beam spots between various signal paths when a satellite is moved between positions. The satellite switches spot beams in order to connect a particular spot beam spot to a different signal processor affording different signal attributes, such as more or less bandwidth, lower or higher power, and the like.

DETAILED DESCRIPTION OF THE INVENTION

The locations of, and patterns for, the cells to be served by a satellite for multiple discrete, different coverage areas and orbital positions are defined at the time that the satellite antenna is manufactured. For instance, an antenna may include a set of horn feeds that produce spot beams by generating radiated energy into, and receiving radiated energy collected by, a reflector. The direction of each spot beam is determined by the fixed position and orientation of the horn feed with respect to the reflector. The location of a cell on the earth that is covered by a particular spot beam has been determined by the position of the antenna horn feed with respect to the reflector and by the position of the satellite with respect to the earth.

According to at least one preferred embodiment of the present invention, a single communications satellite is provided that is capable of providing service to multiple different regions on the surface of the earth depending upon which one of several orbital positions are chosen for the satellite. In order to accommodate these orbital positions, alternative horn feed configurations are built into a single antenna, thereby enabling the antenna to be manufactured before the final position for a satellite is determined. The satellite system also enables the satellite to be initially configured for operation in one orbital position, and to be reconfigured at some time after launch for operation in another orbital position. By reconfiguring the satellite, it may be repositioned to better serve the user community or may be maintained as an in-orbit spare to become a replacement for other malfunctioning satellites within a constellation of satellites, thereby minimizing the interruption of service. Although hereinafter described with respect to the movement of a satellite from one orbital position to a second orbital position, the invention is not so limited, and is applicable to the use of a satellite at a single orbital position. This change of feeds may be desirable, for example, in those circumstances where changing requirements of the user community necessitate a modification of the bandwidth or power levels to particular cells.

Figure 1:
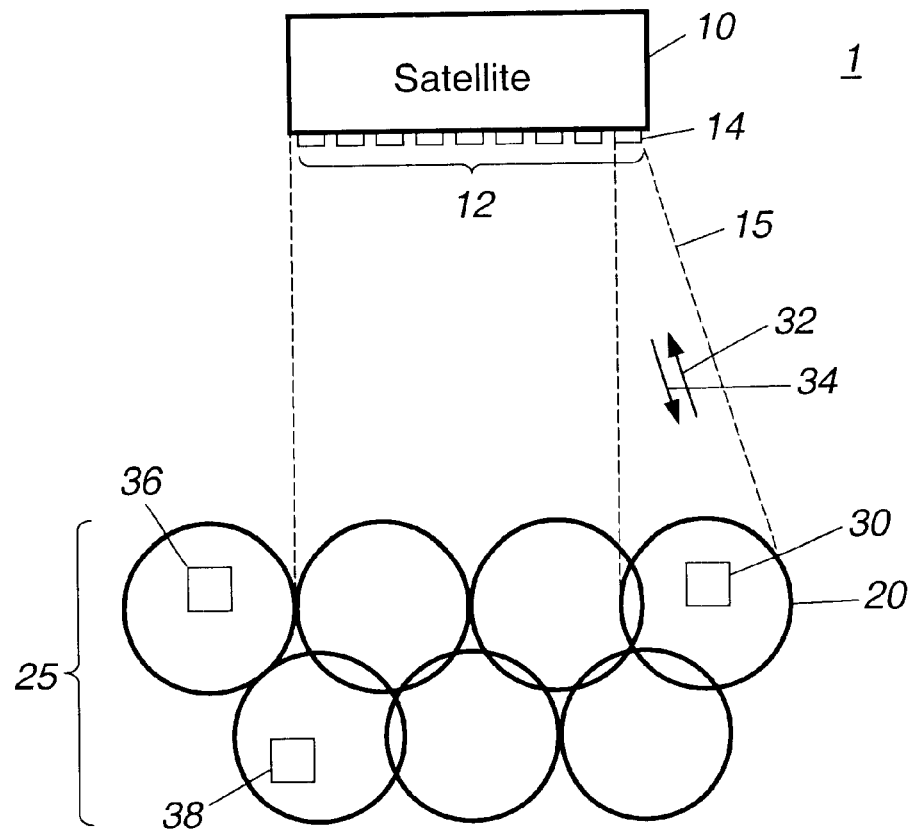
FIG. 1 illustrates a block diagram of a satellite communications system according to a preferred embodiment of the present invention.

FIG. 1 illustrates an exemplary communications satellite system 1 in accordance with a preferred embodiment of the present invention. A communications satellite 10 provides service to a region of the earth by producing a number of spot beams 15. Each spot beam 15 covers a cell 20 on the surface of the earth. The cells 20 collectively define a cell pattern 25 covering a region of the earth. Cells 20 may be placed contiguous with one another or spaced apart, individually, in order to provide coverage to isolated population centers, such as the Hawaiian Islands and the like.

The satellite 10 orbits the earth at one of multiple predetermined orbital positions. By way of example, the satellite 10 may be a geostationary satellite located over a desired continent or land mass. The satellite 10 includes an antenna 12 comprising a plurality of horn feeds 14 and a focusing reflector (not shown). A subset of the horn feeds 14 are activated during operation based upon the orbital position of the satellite 10. The active horn feeds 14 generate spot beams 15 that define the cells 20 upon the surface of the earth. The cells 20 collectively form a cell pattern 25 entirely encompassing a desired land mass, such as the United States, Europe and the like. Each spot beam 15 supports bi-directional communication between the satellite 10 and one or more terminals 30. The bi-directional communications link includes an uplink signal 32 and a downlink signal 34 for carrying communication signals to and from the satellite 10 and the terminal 30. Optionally, a gateway 36 may be included in one or more cells 20. A gateway 36 supports a connection between the satellite 10 and a land based communication network, such as the internet, a land based phone system, a local area network, a wide area network and the like. Terminals 30 may constitute individual user terminals that are mobile or fixed, ground stations, and the like.

Spot beams 15 form a pattern on the Earth that is dependent upon the location of the satellite 10 selected between multiple, predetermined orbital positions. The horn feeds 14 are arranged to configure the active plurality of spot beams 15 in a pattern designed to substantially encompass a desired land mass. During the life of the satellite 10, a control station 38 may direct the satellite 10 to move to a different one of the multiple predetermined orbital positions in order to cover a different land mass or rearrange to spot beams located over different markets in a portion of the earth. By way of example, a satellite may be moved from an orbital position over the United States to an orbital position over Europe. Alternatively, the satellite 10 may be moved from an orbital position centered over New York to an orbital position centered over Los Angeles. When the satellite 10 is moved to the new orbital position, it activates a new subset of the total available horn feeds 14, wherein the active feed subset is configured to generate a plurality of spot beams in a new pattern that substantially conforms to and encompasses the new land mass over which the satellite 10 is located.

Figure 2:
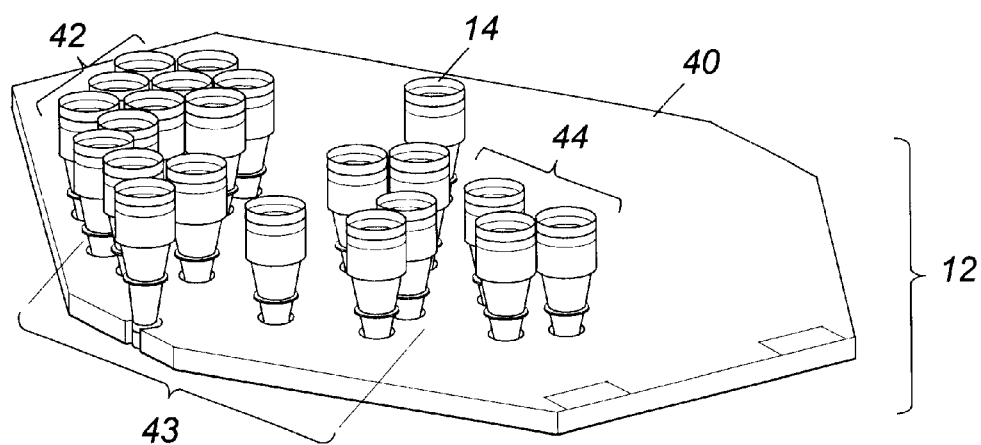
FIG. 2 illustrates a pictorial view of a portion of an antenna including a plurality of horn feeds arranged in accordance with a preferred embodiment of the present invention.

FIG. 2 illustrates the feed pattern of an exemplary antenna configured in accordance with a preferred embodiment of the present invention. The antenna 12 includes multiple horn feeds 14 mounted securely on a platform 40. The horn feeds 14 are positioned at predetermined locations with respect to one another and to their parent reflector. In the example of FIG. 2, the horn feeds 14 are divided into three sets designated by bracketed feed sets 42–44. In the example of FIG. 2, the first feed set 42 includes three horn feeds 14, while the second and third feed sets 43 and 44 include sixteen and three feeds 14, respectively.

The location of each horn feed 14 on platform 40 is defined by the pointing direction of its associated spot beam. The positions of the horn feeds 14 are based upon the multiple land masses over any one of which the satellite 10 may be positioned. For example, the satellite 10 may be designed to cover three to five different land mass shapes, such as land masses having horizontal rectangular shapes (U.S.), square shapes (Europe), triangular shapes (Mexico) and the like. A combination of horn feeds 14 in each of feed sets 42–44 are arranged relative to one another and relative to horn feeds 14 in the other feed sets 42–44, in order to cover each expected land mass shape.

For instance, the horn feeds 14 within feed sets 42 and 43 may be positioned and oriented with respect to the platform 40 to cover the United States, including Alaska and Hawaii, when the satellite 10 is centered over Chicago. In addition, feeds 14 in feed set 44 may be positioned and oriented with respect to the platform 40 and with respect to feed set 43 to cover, in combination, the Eastern United States and Western Europe when the satellite 10 is centered over the Atlantic Ocean.

Figure 3:
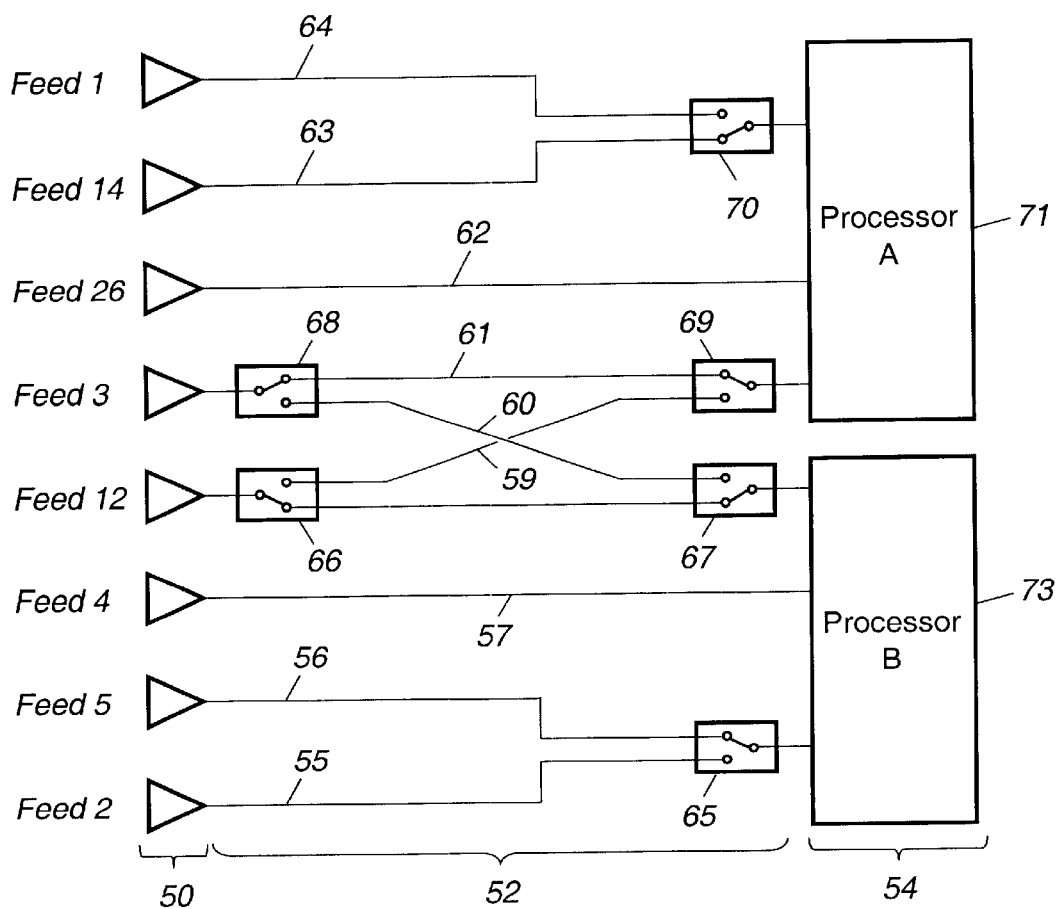
FIG. 3 illustrates a signal path connection diagram in accordance with a preferred embodiment of the present invention.

FIG. 3 illustrates a signal path connection diagram in accordance with a preferred embodiment of the present invention. FIG. 3 illustrates an exemplary group of feeds 50 that communicate through a switching network 52 and a signal processor section 54. The feed group 50 includes feeds #1, #14, #26, #3, #12, #4, #5 and #2 for purposes of illustration only. The switching network 52 includes signal paths 55–64 and switches 65–70 to connect the feed group 50 to the signal processing section 54. The signal processing section 54 includes at least first and second signal processors 71 and 72 designated as processors A and B.

When the satellite is located at a first orbital position, the switches 65–70 are set to establish signal connections between a desired subset of feeds in feed group 50 and one or both of signal processors 71 and 72. In the example of FIG. 3, when the satellite is at a first orbital position, the switches 65–67 are set to connect feeds #5 and #12 to signal processor 73, while switches 68-70 are set to connect feeds #3 and #14 to processor 71. Feeds #4 and #26 are hardwired via paths 57 and 62 to processors 71 and 73, respectively. Feeds #1 and #2 are inactive while the satellite is located at the first orbital position.

When the satellite is moved to a second orbital position, the switching network 52 is reconfigured to establish new signal connections with the signal processing section 54. For instance, switches 65–70 may be toggled to connect feeds #2 and #3 to processor 73 and feeds #1 and #12 to processor 71, while feeds #14 and #5 are rendered inactive. Feeds #4 and #26 remain hardwired and actively connected to processors 71 and 73.

Figure 4:
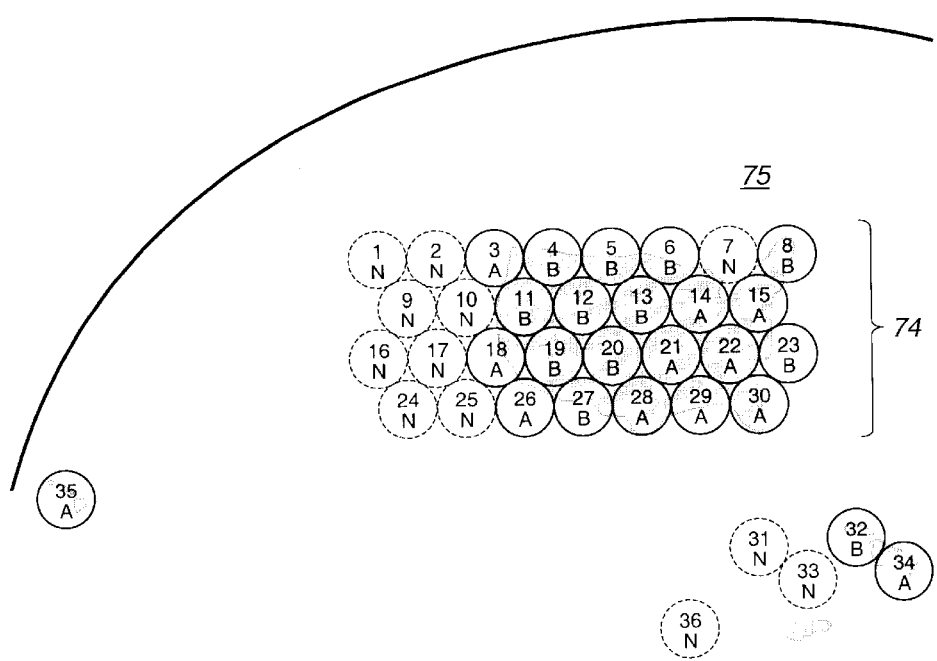
FIG. 4 illustrates an exemplary cell pattern produced by a satellite positioned over the United States at a first orbital position in accordance with a preferred embodiment of the present invention.
Figure 5:
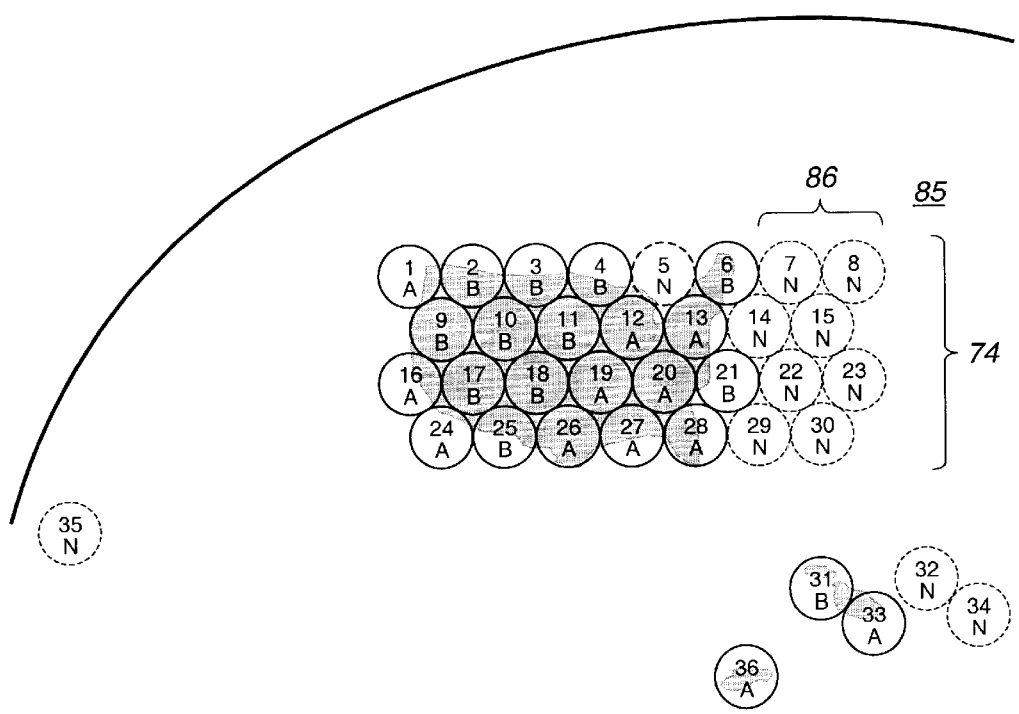
FIG. 5 illustrates an exemplary cell pattern produced by a satellite positioned in a second orbital position over the United States in accordance with a preferred embodiment of the present invention.

FIGS. 4 and 5 illustrate typical cell patterns that may be generated by projecting a number of spot beams onto the surface of the Earth from a satellite in the first and second orbital positions, respectively. The cell patterns are designed to provide communication services to specific regions of the Earth. Each spot beam is formed by precisely positioning an antenna feed relative to a reflector on board the satellite. Each cell is assigned a number which identifies the specific antenna feed used to create the corresponding spot beam and a letter identifying the signal bandwidth/power or some other signal attribute that is required for a particular cell. In the example of FIGS. 4 and 5, 36 cells are shown corresponding to 36 different antenna feeds.

The satellite is configured to produce beam spots only for those cells that cover the desired regions from the defined orbital positions. Cells that are needed to serve the desired regions of coverage are designated as active and are depicted by heavy black circles. Each of the feeds employed to create an active cell is connected by a signal path to a signal processor that supports the required bandwidth for the particular cell. Of the 36 cells located, 24 are shown to be active in FIG. 4. Twelve of the active cells are shown to be assigned signal attribute A, while the remaining 12 are shown to be assigned signal attribute B. Any number of possible signal attributes may be supported up to the total number of active cells, and the number of cells assigned to a particular attribute may vary.

FIG. 4 illustrates an exemplary cell pattern 75 produced by a satellite located at a first orbital position over the United States, such as centered over Los Angeles. The overall cell pattern 75 is defined by discrete spot beams numbered #1 to #36. The spot beams #1–#36 are arranged such that a first beam group 74 is arranged contiguous to form a rectangular configuration encompassing the United States, with inactive spot beams located off the West Coast of the United States. The cell pattern 75 further includes individual spot beams #31–#36 oriented to cover islands, such as Hawaii, Puerto Rico and the like.

In the example of FIG. 4, each spot beam is assigned a number 1–36 and a letter, A, B or N. The reference letters A, B and N denote the signal processor to which the spot beam #1–#36 is assigned. For instance, spot beams #35 and #34 include a reference numeral A indicating that a connection via the switching network 52 to the signal processor 71. Spot beams #31, #33 and #36 include a reference numeral N indicating that the feeds associated therewith are not active.

After launching the satellite, it may be moved to a second defined orbital position which would shift the beam pattern 74 relative to the United States, as shown in FIG. 5. Once the satellite move is completed, a control station 38 transmits a signal to the satellite for the purpose of instructing the satellite to reconfigure itself for operation in the new orbital position. The satellite reconfigures itself with a network of on-board switches that are used to reconnect antenna feeds to new signal paths appropriate to provide service to a second set of desired regions on the surface of the Earth that may wholly or partially overlap the regions served from the first orbital position. The number of orbital positions and configurations supported by a given satellite is not limited to two and may be increased by including the necessary switching circuitry and signal processors to account for the demands placed upon each feed while the satellite is in any desired orbital position.

FIG. 5 illustrates a cell pattern that may be produced by projecting the spot beams onto the surface of the Earth from the satellite when in a second orbital position. The Nadir pointing direction associated with the second defined orbital position is at a more easterly longitude than the Nadir pointing direction associated with the first orbital position. The regions served from the first orbital position have therefore shifted to the West relative to the position of the satellite. Once again, 24 cells may be employed to provide coverage, however the cells that have been designated as active differ from those in the previous example. The active cells differ since the footprint for the spot beams has shifted as the relative position of the satellite has shifted.

Although many of the feeds depicted as active in FIG. 5 were also depicted as active in FIG. 4, the required signal path connections for many of the feeds may change. The feed signal path connections may change because each cell now covers a different area on the surface of the Earth than while in the previous orbital positions. Some cells that were previously inactive, such as cell #1, are now connected to a processor that supports a bandwidth A. Other cells that previously supported bandwidth A, such as cell #3, are now connected to a processor that supports bandwidth B.

FIG. 5 illustrates an exemplary embodiment in which the satellite 10 has moved to a second orbital position, at which the beam group 74 still encompasses the United States, but extends beyond the East Coast of the United States. The switching network 52 is changed at the instruction of the satellite 10 and/or the control center 38, when the satellite 10 is moved to the second orbital position. The switching network 52 is switched in order to reroute predetermined feeds 14 to different signal processors 71, 73 where necessary and to deactivate predetermined feeds 14 associated with spot beams that no longer cover a desired area, land mass, water area or otherwise. For instance, in FIG. 5, a group of inactive spot beams 86 are located off the East Coast of the United States and have been turned off as they no longer cover a desirable market area. Spot beams #32, #34 and #35 are deactivated, while spot beams #31, #33 and #36 are activated.

In the examples of FIGS. 4 and 5, it may be seen that the signal paths for feeds #3 and #12 associated with spot beams #3 and #12 are changed when the satellite is moved from the first orbital position to the second orbital position. For instance, the feed #12 associated with spot beam #12 is assigned to signal processor 73 in the configuration illustrated in FIG. 4, while the spot beam #12 is assigned to signal processor 71 in the configuration illustrated in FIG. 5.

It may be desirable to change the signal path associated with a particular feed when a satellite is moved to an orbital position that aligns a particular spot beam with a geographic area having significantly different demand than previously required of the spot beam. For instance, in the example of FIG. 4, spot beam #12 initially was located over the Western states of Utah, Idaho and Montana. Spot beam #12 may not require an overly large bandwidth or power demand when located over Utah, Idaho and Montana. Thus, a signal path with narrow bandwidth and/or low power may be assigned to feed #12 through processor 73.

However, when the satellite 10 moves to the second orbital position illustrated in FIG. 5, the spot beam #12 is realigned over the Chicago Metropolitan Area and the surrounding states. Hence, spot beam #12 may be required to support significantly more user demand and thus greater bandwidth and/or power. Accordingly, the feed #12 is reassigned by the switching network 52 to a signal path connected to the signal processor 71 which may afford feed #12 greater bandwidth and/or power.

Similarly, spot beam #3 may be rerouted from processor 71 in FIG. 4 to processor 73 in FIG. 5 as the spot beam #3 is moved from the West Coast to an area substantially covering upper Montana and North Dakota. Multiple switch configurations and signal paths may be assigned to certain feeds based upon the number of potential positions and markets, at which the spot beam associated with the feed may be located.

In the example of FIGS. 4 and 5, a satellite supports two different orbital positions and two different signal bandwidths. Feed #1 is inactive in the configuration of FIG. 4 and active with bandwidth A in the configuration of FIG. 5. Feed #14 is active with bandwidth A in the configuration of FIG. 4 and inactive in the configuration of FIG. 5. Feeds #1 and #14 may be paired to share a signal path with bandwidth A by means of a two input, one output switch that connects feed #14 to the processor in one configuration and connects feed #1 to the processor in the other configuration.

Similarly, feed #2 is inactive in the configuration of FIG. 4 and inactive with bandwidth B in the configuration of FIG. 5, while feed #5 is active with bandwidth B in the configuration of FIG. 4 and inactive in the configuration of FIG. 5. Feeds #2 and #5 may share a connection to a signal path with bandwidth B by using a similar switch. Feed #26 is active with bandwidth A in both configurations, while feed #4 is active with bandwidth B in both configurations. Each of feeds #4 and #26 may be allocated a dedicated signal path with no switching requirements. Feed #3 is active with bandwidth A in the configuration of FIG. 4 and inactive with bandwidth B in the configuration of FIG. 5, while feed #12 is active with bandwidth B in the configuration of FIG. 4 and inactive with bandwidth A in the configuration of FIG. 2. Feeds #3 and #12 are paired by using a set of four switches to provide each feed with one of two possible signal path connections.

The switches are changed en masse so that at any given time each feed is connected to one signal path, and each signal path is connected to one feed. The same basic principles may be applied to constructing a network of switches that supports any number of feed configurations and signal processor attributes. The network of switches used to reconfigure the satellite for operation in different orbital positions may be employed equally as well toward changing the signal path bandwidth assignments of the various ground cells served by the satellite from one orbital position, in response to the changing requirements of a particular user community. For instance, a cell may be located over a suburban area that requires low demand. However, over the years, the suburban area may expand and require greater bandwidth from the cell. In this example, the signal path for the cell may be rerouted to a higher bandwidth processor, while the satellite is not moved from its initial orbital position.

It is to be understood that the preferred embodiments of the present invention are not limited to the particular configurations and signal path connections illustrated in the drawings. For instance, more signal processors may be used to afford larger bandwidth and/or power, or to afford a wider range of selections between particular bandwidth and power demands. In addition, the signal processors 71 and 73 may vary other signal attributes, besides and/or in addition to bandwidth and power. The signal processors 71 and 73 may be simple or complex. For instance, a simple configuration for the signal processors 71 and 73 may simply represent circuits including gain control and filter components, such as when the satellite operates in a bent-pipe type configuration. In a bent-pipe configuration, the satellite does not analyze the substance of incoming messages, but instead simply relays incoming messages to a predetermined outbound carrier signal and/or spot beam.

Alternatively, the signal processors 71 and 73 may be semi-smart, whereby they partially decode uplink signals in order to select between one of several downlink signals and/or spot beams. For instance, the signal processors may route all incoming communication signals from Chicago to a downlink directed to a gateway or ground station located in Minnesota. As a further alternative, the signal processors 71 and 73 may be very sophisticated, such as by supporting demodulation, error detection and error correction of incoming uplink signals and encoding and modulation of downlink signals. The satellite may demodulate the uplink signals and route each individual communications signal to a particular spot beam and downlink signal associated with a destination terminal.

The preferred embodiments of the present invention may be implemented in a variety of signal protocols, such as frequency division multiple access (FDMA), time division multiple access (TDMA), and/or code division multiple access (CDMA). One or more of the foregoing protocols or any other conventional signal protocol (ATM, etc.) may be used to support the communications signals carried over the spot beams.

The signal processors 71 and 73 may be configured with digital or analog circuitry or a combination thereof. The antenna may support carrier frequencies in any frequency range.

The preferred embodiments of the present invention allow a satellite to provide coverage from one or more orbital positions. The satellite includes antennas designed with more feeds than are needed to cover the cells associated with a particular orbital position. One group of feeds is positioned to produce spot beams which cover a set of desired cells from one predetermined orbital position, while additional feeds are positioned such that other cells (which may include some or all of the same regions on the Earth as the first set) are covered from alternative predetermined orbital positions. A different group of feeds may be used to produce the spot beams relevant to each separate orbital position supported by the antenna design. It is expected that a large number of feeds may be used in more than one orbital position, albeit to cover different individual ground cells in each case.

The switching network allows the antenna to be configured for operation from a particular orbital position. The switches are used to activate specific feeds that are required to produce the spot beams needed for providing coverage to cells from a present orbital position. For a system in which each spot beam may be assigned to one of a number of possible processing groups based on some signal attribute such as bandwidth or power, the same switch network may also serve to route the signal from each feed along a signal path to an appropriate signal processor.

The foregoing embodiments in accordance with the present invention provide a flexible communication system that is designed in a manner that is not tied to a single orbital position. The preferred embodiments improve the time to market for the system since manufacturing of the antennas may precede the final selection of an orbital position for the satellite. The preferred embodiments allow on board reconfiguration of satellite spot beams to be commanded from a control center on the Earth and allow reconfiguration of the signal path for each beam. The same antenna feeds may be used in different orbital positions for providing coverage to different ground cells. The preferred embodiments allow a satellite to be moved to a different orbital position in order to better serve a particular user community and to allow a satellite to be launched as a spare to become an immediate replacement for any malfunctioning member of a satellite constellation.

It is understood that spot beams may be directed to areas not necessarily associated with land masses. For instance, it may be desirable to direct one or more spot beams to areas or bodies of water, such as shipping lanes or seas, and such as busy air traffic areas. While particular elements, embodiments and applications of the present invention have been shown and described, it will be understood that the invention is not limited thereto since modifications may be made by those skilled in the art, particularly in light of the foregoing teachings. It is, therefore, contemplated by the appended claims to cover such modifications as incorporate those features which come within the spirit and scope of the invention.

What is claimed is:

1. A method for controlling a configuration of spot beams produced by a communications satellite, the method comprising the steps of:
   positioning a geostationary satellite at a first discrete orbital position with respect to a first portion of the earth;
   activating a first plurality of active spot beams in a first beam pattern to substantially encompass the first portion of the earth;
   moving the geostationary satellite to a second discrete orbital position with respect to a second portion of the earth; and
   activating a second plurality of spot beams in a second beam pattern to substantially encompass the second portion of the earth.

2. The method of claim 1, further comprising the step of:
   activating at least one common spot beam in said first and second pluralities of spot beams.

3. The method of claim 2, further comprising the step of:
   when said satellite moves from said first orbital position to said second orbital position, re-routing said common spot beam from a first signal path to a second signal path, respectively to adjust at least one signal attribute of said common spot beam.

4. The method of claim 1, further comprising moving the satellite between first and second geostationary orbital positions.

5. A method for controlling a configuration of spot beams produced by a communications satellite, the method comprising the steps of:
   positioning a geostationary satellite at a first discrete orbital position with respect to a first portion of the earth;
   activating a first plurality of active spot beams in a first beam pattern to substantially encompass the first portion of the earth;
   moving the geostationary satellite to a second discrete orbital position with respect to a second portion of the earth; and
   activating a second plurality of spot beams in a second beam pattern to substantially encompass the second portion of the earth, said second plurality of spot beams being mutually exclusive from said first pluralities of spot beams.

6. A method for controlling a configuration of spot beams produced by a communications satellite, the method comprising the steps of:
   positioning a geostationary satellite at a first discrete orbital position with respect to a first portion of the earth;
   activating a first plurality of active spot beams in a first beam pattern to substantially encompass the first portion of the earth;
   moving the geostationary satellite to a second discrete orbital position with respect to a second portion of the earth; and
   activating at least one new spot beam when the satellite is moved to said second orbital position said activated new spot beam having been inactive when the satellite was at said first orbital position.

7. A method for controlling a configuration of spot beams produced by a communications satellite, the method comprising the steps of:
   positioning a geostationary satellite at a first discrete orbital position with respect to a first portion of the earth;
   activating a first plurality of active spot beams in a first beam pattern to substantially encompass the first portion of the earth;
   moving the geostadonary satellite to a second discrete orbital position with respect to a second portion of the earth; and
   deactivating at least one spot beam when the satellite is moved to said second orbital position, said deactivated spot beam having been active when the satellite was at said first orbital position.

8. A method for controlling a configuration of spot beams produced by a communications satellite, the method comprising the steps of:
   positioning a satellite at a first discrete orbital position with respect to a first portion of the earth;
   activating a first plurality of active spot beams in a first beam pattern to substantially encompass the first portion of the earth;
   moving the satellite to a second discrete orbital position with respect to a second portion of the earth;
   activating a second plurality of spot beams in a second beam pattern to substantially encompass the second portion of the earth; and
   adjusting a signal attribute of at least one spot beam that is active in both said first and second pluralities of spot beams, said signal attribute including one of spot beam bandwidth and power.

9. A method for controlling a configuration of spot beams produced by a communications satellite, the method comprising the steps of:
   positioning a geostationary satellite at a first discrete orbital position with respect to a first portion of the earth;
   configuring a first plurality of active spot beams in a first beam pattern to substantially encompass the first portion of the earth;
   moving the geostationary satellite to a second discrete orbital position with respect to a second portion of the earth;
   configuring a second plurality of spot beams in a second beam pattern to substantially encompass the second portion of the earth; and
   dividing said first and second pluralities of active spot beams into first, second and common subsets of spot beams, said first configuring step activating said first and common subsets and deactivating said second subset, said second configuring step deactivating said first subset and activating said second and common subsets.

10. A method for controlling a configuration of spot beams produced by a communications satellite, the method comprising the steps of:
    positioning a geostationary satellite at a first discrete orbital position with respect to a first portion of the earth;

activating a first plurality of active spot beams in a first beam pattern to substantially encompass the first portion of the earth;

moving the geostationary satellite to a second discrete orbital position with respect to a second portion of the earth; and activating a second plurality of spot beams in a second beam pattern to configure said first and second beam patterns to encompass different portions of a desired land mass.

11. A communications satellite, comprising:

at least one antenna for transmitting and receiving communications signals, said antenna defining first and second spot beam patterns separately activated when the satellite is located at first and second discrete geostationary orbital positions, respectively, and a switch network activating a first group of spot beams forming said first spot beam pattern when the satellite is located at the first discrete geostationary orbital position, and activating a second group of spot beams forming said second spot beam pattern when the satellite is located at the second discrete geostationary orbital position.

12. The communications satellite of claim 11, further comprising:

first and second signal processors that support first and second different signal attributes, said switch network connecting said first and second groups of spot beams to said first and second processors, respectively.

13. The communications satellite of claim 11, further comprising: an an array of horn feeds in said -antenna, said switch network connecting a horn feed to a signal path having a narrow bandwidth when the satellite is in the first orbital position, and connecting said horn feed to a signal path having a wide bandwidth when the satellite is in the second orbital position.

14. A communications satellite, comprising:

at least one antenna for transmitting and receiving communications signals, said antenna defining first and second spot beam patterns separately activated when the satellite is located at first and second discrete geostationary orbital positions, respectively, said antenna comprising a plurality of horn feeds, each horn feed generating a corresponding spot beam when activated,; and a switch network activating a first group of spot beams forming said first spot beam pattern when the satellite is located at the first discrete geostationary orbital position, and activating a second group of spot beams forming said second spot beam pattern when the satellite is located at the second discrete geostationary orbital position wherein a common horn feed generates a spot beam in each of said first and second groups of spot beams.

15. A communications satellite, comprising:

at least one antenna for transmitting and receiving communications signals, said antenna defining first and second spot beam patterns separately activated when the satellite is located at first and second discrete geostationary orbital positions, respectively, said antenna comprising multiple horn feeds divided into first, second and common groups, and a switch network activating a first group of spot beams forming said first spot beam pattern when the satellite is located at the first discrete geostationary orbital position, and activating a second group of spot beams forming said second spot beam pattern when the satellite is located at the second discrete geostationary orbital position, said switch network activating said first and common groups of horn feeds to generate said first spot beam pattern when the satellite is at the first geostationary orbital position, said switch network activating said common and second groups of whom feeds to generate said second spot beam pattern when the satellite is at the second geostationary orbital position.

16. A communications satellite, comprising:

an antenna having an array of feeds generating a configuration of spot beams to carry communications signals;

signal processors processing communications signals carried over said spot beams to and from the satellite; and a switch network defining signal paths between said signal processors and feeds, said switch network activating at least one feed when the satellite is located at a first discrete orbital position and deactivating said at least one feed when the satellite is located at a second discrete orbital position.

17. The communications satellite of claim 16, wherein said switch network activates a subset of said feeds when the satellite is located at said first orbital position.

18. The communications satellite of claim 16, wherein said switch network deactivates a subset of said feeds when the satellite is moved from said first orbital position to said second orbital position.

19. A communications satellite, comprising:

an antenna having an array of feeds generating a configuration of spot beams to carry communications signals;

signal processors processing communications signals carried over said spot beams to and from the satellite; and a switch network defining signal paths between said signal processors and feeds, said switch network activating at least one feed when the satellite is located at a first discrete orbital position and deactivating said at least one feed when the satellite is located at a second discrete orbital position, said switch network maintaining active a common subset of feeds used at both said first and second orbital positions when the satellite is moved from said first orbital position to said second orbital position.

20. A communications satellite, comprising:

an antenna having an array of feeds generating a configuration of spot beams to carry communications signals;

signal processors processing communications signals carried over said spot beams to and from the satellite; and a switch network defining signal paths between said signal processors and feeds, said switch network activating at least one feed when the satellite is located at a first discrete orbital position and deactivating said at least one feed when the satellite is located at a second discrete orbital position;

wherein the feeds are divided into first and second feed sets, said switch network routing said first and second feed sets to first and second signal processors, respectively, when the satellite is moved from the first to second orbital positions.

21. A communications satellite system comprising:

terminals for transmitting and receiving communications signals, said terminals located around the earth in cells; and at least one satellite being located at one of multiple predetermined geostationary orbital positions, said satellite including an antenna having an array of feeds generating spot beams associated with said cells on the earth, said satellite activating different groups of feeds on the antenna to form different spot beam patterns associated with different predetermined discrete geostationary orbital positions.

22. The communications satellite system of claim 21, further comprising:

a gateway relaying communications signals between said satellite and a land-based communications network.

23. The communications satellite system of claim 21, further comprising:

a control terminal directing the satellite to move from one orbital position to another orbital position.

24. A communications satellite system comprising:

terminals for transmitting and receiving communications signals, said terminals located around the earth in cells;

at least one satellite being located at one of multiple predetermined orbital positions, said satellite including an antenna having an array of feeds generating spot beams associated with said cells on the earth, said satellite activating different groups of feeds on the antenna to form different spot beam patterns associated with different predetermined discrete orbital positions; and signal processors controlling a power level associating with each spot beam, said satellite switching at one feed from a low power signal processor to a high power signal processor when the satellite moves from an orbital position, at which low power is required of said feed, to an orbital position, at which high power is required of said feed.

25. The communications satellite system of claim 21, wherein the satellite further comprises:

a switching network connecting and disconnecting combinations of feeds to change said spot beam pattern formed by an active group of feeds.

26. A communications satellite system comprising:

terminals for transmitting and receiving communications signals, said terminals located around the earth in cells;

at least one satellite being located at one of multiple predetermined orbital positions, said satellite including an antenna having an array of feeds generating spot beams associated with said cells on the earth, said satellite activating different groups of feeds on the antenna to form different spot beam patterns associated with different predetermined discrete orbital positions; and signal processors controlling at least one of power and bandwidth allocated to each beam spot, said satellite switching at least one feed from a signal processor having at least one of low power and narrow bandwidth, to a signal processor having at least one of high power and wide bandwidth, when the satellite moves from one orbital position to another.

* * * * *